US011306658B2

(12) United States Patent
Moniz et al.

(10) Patent No.: US 11,306,658 B2
(45) Date of Patent: Apr. 19, 2022

(54) COOLING SYSTEM FOR A TURBINE ENGINE (71) Applicant: General Electric Company, Schenectady, NY (US)

(72) Inventors: Thomas Ory Moniz, Loveland, OH (US); Ann Marie Yanosik, Liberty Township, OH (US); Patrick Sean Sage, West Chester, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 16/867,625

(22) Filed: May 6, 2020

(65) Prior Publication Data

US 2020/0386161 A1 Dec. 10, 2020

Related U.S. Application Data (62) Division of application No. 15/351,738, filed on Nov. 15, 2016, now Pat. No. 10,677,164.

(51) Int. Cl.
*F02C 7/143* (2006.01)
*F02C 7/16* (2006.01)
*F02C 3/30* (2006.01)
*F02C 7/141* (2006.01)
*F02C 3/04* (2006.01)

(52) U.S. Cl.
CPC .............. *F02C 7/1435* (2013.01); *F02C 3/30* (2013.01); *F02C 7/141* (2013.01); *F02C 7/16* (2013.01); *F02C 3/04* (2013.01); *F05D 2260/212* (2013.01); *Y02T 50/60* (2013.01)

(58) Field of Classification Search
CPC ........ F02C 7/1435; F02C 7/143; F02C 7/141; F02C 3/30; F02C 3/305; F02C 7/16; F02C 7/18; Y02T 50/676; F05D 2260/212
See application file for complete search history.

(56) References Cited

U.S. PATENT DOCUMENTS

| 2,863,282 A | 12/1958 | Torell |
| 3,055,172 A | 9/1962 | Johnson |
| 5,698,209 A | 12/1997 | Shono et al. |

(Continued)

FOREIGN PATENT DOCUMENTS

| CN | 101487422 A | 7/2009 |
| EP | 2418367 A1 | 2/2012 |

OTHER PUBLICATIONS

Chinese Office Action Corresponding to Application No. 201711129034 dated Jul. 11, 2019.

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A gas turbine engine includes a compressor section having a high pressure compressor and a core casing surrounding the compressor section and defining an inlet. The gas turbine engine also includes a cooling system for cooling air in or to the compressor section. The cooling system includes a fluid tank for storing a volume of cooling fluid and a fluid line assembly in fluid communication with the fluid tank. The fluid line assembly includes an outlet positioned upstream of the high pressure compressor and downstream of the inlet defined by the core casing for injecting cooling fluid into an airflow upstream of the high pressure compressor.

18 Claims, 10 Drawing Sheets

(56) References Cited

U.S. PATENT DOCUMENTS

| | | | |
|---|---|---|---|
| 6,405,521 | B1 | 6/2002 | Ranasinghe et al. |
| 6,449,953 | B1 | 9/2002 | Hook, Jr. et al. |
| 6,484,508 | B2 | 11/2002 | Rocklin et al. |
| 6,516,603 | B1 | 2/2003 | Urbach et al. |
| 6,715,295 | B2 | 4/2004 | Gadde et al. |
| 7,353,654 | B2 | 4/2008 | Bolis et al. |
| 7,520,137 | B2 | 4/2009 | Hoffmann et al. |
| 9,046,057 | B2 | 6/2015 | Efremkin et al. |
| 9,657,585 | B2 | 5/2017 | Takahashi et al. |
| 9,995,314 | B2 * | 6/2018 | Miller .................. F01D 5/081 |
| 10,119,471 | B2 * | 11/2018 | Mukhopadhyay ...... F02C 7/185 |
| 2002/0112465 | A1 * | 8/2002 | Payling ................. F02C 7/224 60/39.53 |
| 2008/0250769 | A1 | 10/2008 | Wagner et al. |
| 2013/0036747 | A1 | 2/2013 | Fuchs et al. |
| 2014/0123657 | A1 * | 5/2014 | Tham .................. F01D 5/088 60/772 |
| 2016/0169107 | A1 | 6/2016 | Ramirez Muěoz et al. |
| 2016/0237904 | A1 | 8/2016 | Scarboro et al. |

\* cited by examiner

COOLING SYSTEM FOR A TURBINE ENGINE

CROSS REFERENCE TO RELATED APPLICATION

This Application is a divisional of U.S. patent application Ser. No. 15/351,738 entitled "COOLING SYSTEM FOR A TURBINE ENGINE", filed Nov. 15, 2016, which is incorporated herein by reference.

FIELD

The present subject matter relates generally to a cooling system for a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

It is desirable to increase an overall pressure ratio of the gas turbine engine in order to increase an efficiency of the gas turbine engine. The overall pressure ratio refers generally to a ratio of a pressure measured at a forward end of the compressor section to a pressure measured at an aft end of the compressor section. However, as the overall pressure ratio increases, a temperature of the compressed air also increases. The materials used to construct rotor blades and/or stator vanes in the compressor section typically are not designed to withstand heightened temperatures that can accompany an increased overall pressure ratio.

Accordingly, a device for cooling compressed air in a compressor section of a gas turbine engine would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine defining an axial direction and a radial direction is provided. The gas turbine engine includes a compressor section for progressively compressing air, the compressor section including a high pressure compressor. The gas turbine engine also includes a core casing surrounding the compressor section and defining an inlet. The gas turbine engine also includes a cooling system for cooling air in or to the compressor section. The cooling system includes a fluid line assembly. The fluid line assembly includes an outlet positioned upstream of the high pressure compressor and downstream of the inlet defined by the core casing for injecting cooling fluid into an airflow upstream of the high pressure compressor.

In another exemplary embodiment of the present disclosure, a cooling system for cooling air in or to a compressor section of a gas turbine engine is provided. The gas turbine engine includes a core casing surrounding the compressor section and defining an inlet. The compressor section includes a high pressure compressor. The cooling system includes a fluid line assembly. The fluid line assembly includes an outlet configured to be positioned upstream of the high pressure compressor and downstream of the inlet defined by the core casing for injecting cooling fluid into an airflow upstream of the high pressure compressor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
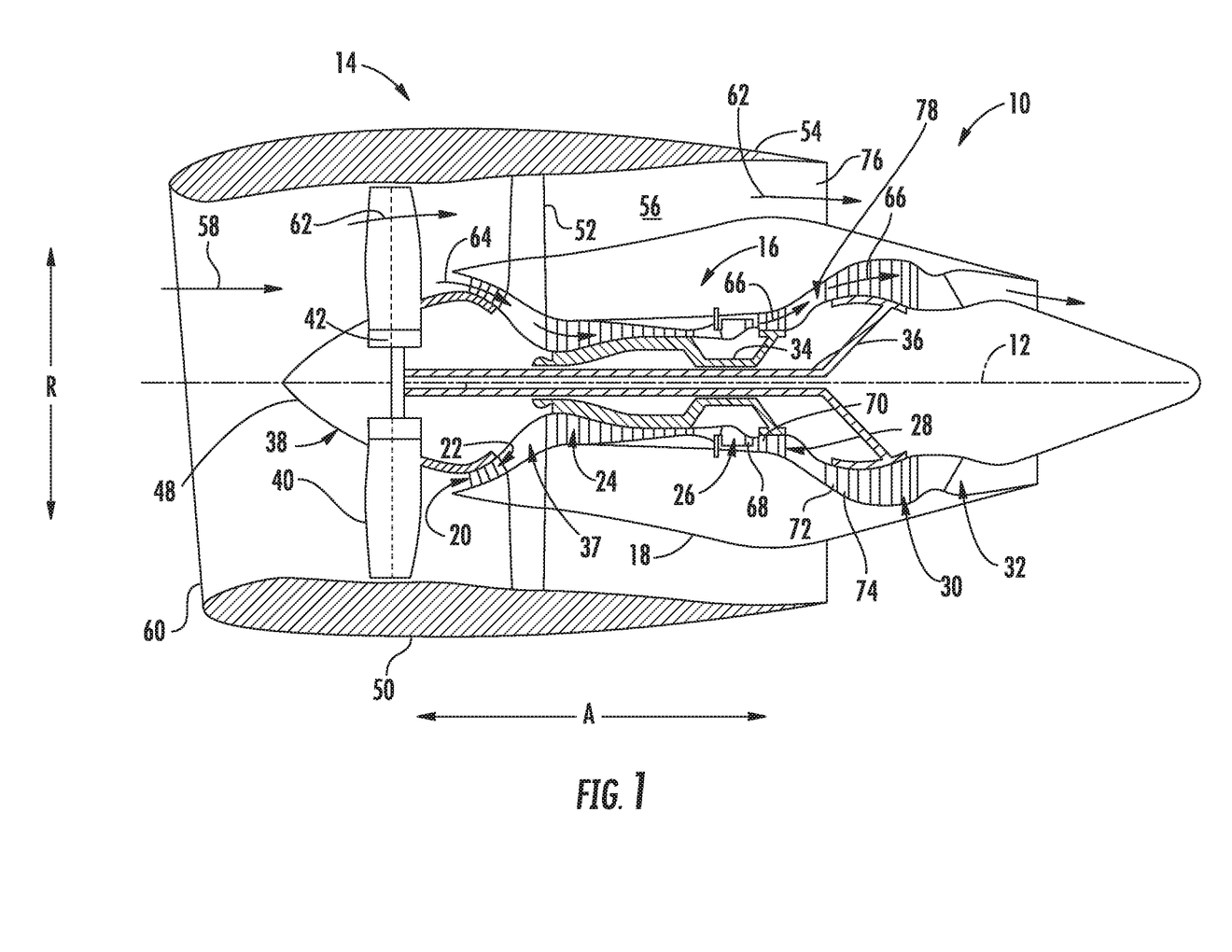
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 4). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, and turbine section together define a core air flowpath 37.

For the embodiment depicted, the fan section 14 includes a fixed-pitch fan 38 having a plurality of fan blades 40 coupled to a disk 42 in a spaced apart manner. As depicted, the fan blades 40 extend outwardly from the disk 42 generally along the radial direction R. The fan blades 40 and disk 42 are together rotatable about the longitudinal axis 12 by LP shaft 36. For the embodiment depicted, the turbofan engine 10 is configured as a "direct-drive" engine, such that the LP shaft 36 drives the fan 38 directly, without use of a reduction gearbox. However, in other embodiments of the present disclosure, the turbofan engine 10 may instead utilize a reduction gearbox, and further may include an actuation assembly for varying a pitch of the plurality of fan blades 40.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. Moreover, the nacelle 50 is supported relative to the core turbine engine 16 by a plurality of circumferentially-spaced outlet guide vanes 52, and a downstream section 54 of the nacelle 50 extends over an outer portion of the core turbine engine 16 so as to define a bypass airflow passage 56 therebetween.

During operation of the turbofan engine 10, a volume of air 58, enters the turbofan 10 through an associated inlet 60 of the nacelle 50 and/or fan section 14. As the volume of air 58 passes across the fan blades 40, a first portion of the air 58, as indicated by arrows 62, is directed or routed into the bypass airflow passage 56 and a second portion of the air 58, as indicated by arrow 64, is directed or routed into the core air flowpath 37, or more particularly, into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the gas turbine engine may be any other suitable aeronautical gas turbine engine, such as a turbojet engine, turboshaft engine, turboprop engine, etc. Further, in still other exemplary embodiments of the present disclosure, the gas turbine engine may instead be configured as an industrial/utility gas turbine engine, e.g., for power generation, or an aeroderivative gas turbine engine, e.g., for marine applications.

Figure 2:
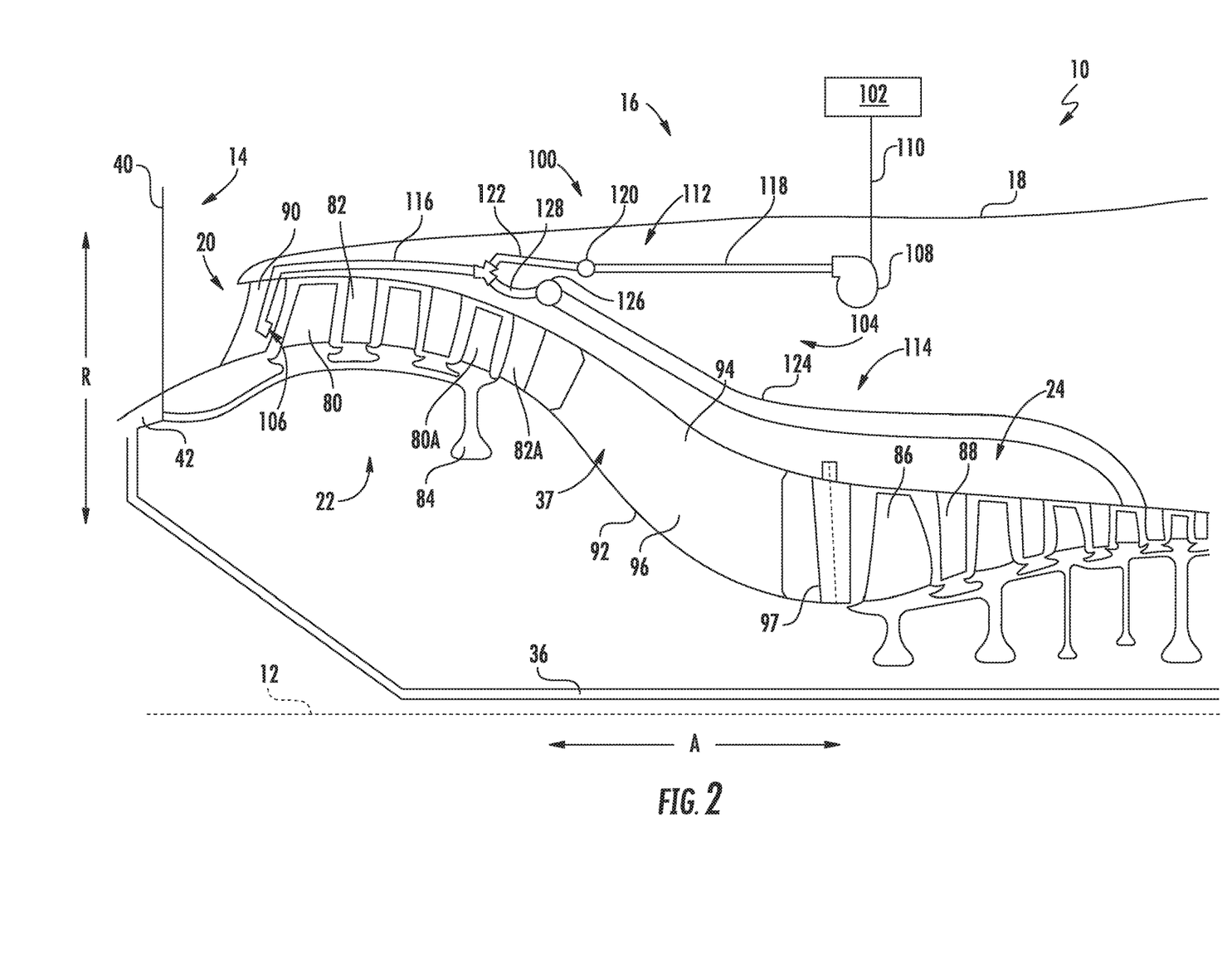
FIG. 2 is close-up, schematic view of a compressor section of the exemplary gas turbine engine of FIG. 1, including a cooling system in accordance with an exemplary embodiment of the present disclosure.

Referring now to FIG. 2, a close-up, side, schematic view of the compressor section of the exemplary turbofan engine 10 of FIG. 1 is provided. As depicted, the compressor section generally includes the LP compressor 22 and the HP compressor 24. The LP compressor 22 includes various stages of LP compressor rotor blades 80 rotatable about the longitudinal centerline 12 and LP compressor stator vanes 82. In addition, the exemplary LP compressor 22 includes an aft-most rotor 84 (i.e., for the embodiment depicted, a stage three rotor); the LP compressor rotor blades 80 include a plurality of aft-most stage LP compressor rotor blades 80A (i.e., for the embodiment depicted, a plurality of stage three LP compressor rotor blades); and the LP compressor stator vanes 82 include a plurality of aft-most LP compressor stator vanes 82A. The plurality of aft-most stage LP compressor rotor blades 80A are each attached to the aft-most rotor 84, and rotatable with the aft-most rotor 84. Similarly, the HP compressor 24 includes various stages of HP compressor rotor blades 86 rotatable about the longitudinal centerline 12 and HP compressor stator vanes 88.

Additionally, for the embodiment depicted, the turbofan engine 10 includes a stage of inlet guide vanes 90 located downstream of the inlet 20 defined by the core casing 18 and upstream of the compressor section (or, more particularly, upstream of the LP compressor 22). For the embodiment depicted, the stage of inlet guide vanes 90 includes a plurality of stationary inlet guide vanes. However, in other exemplary embodiments, the stage of inlet guide vanes 90 may instead include a plurality of variable inlet guide vanes having, e.g., a variable geometry for modifying a swirl of an airflow into the core air flowpath 37 upstream of the compressor section.

Moreover, extending between the LP compressor 22 and the HP compressor 24, the turbofan engine 10 includes an inner flowpath liner 92 and an outer flowpath liner 94. The outer flowpath liner 94 is located outward from the inner flowpath liner 92 along the radial direction R. The inner and outer flowpath liners 92, 94 together define a portion of the core air flowpath 37 extending from the LP compressor 22 to the HP compressor 24. Further, the turbofan engine 10 includes a strut 96 and a variable guide vane 97 positioned within the compressor section at a location upstream of the HP compressor 24 and downstream of the LP compressor 22. More particularly, the exemplary turbofan engine 10 includes a plurality of struts 96 spaced along the circumferential direction C of the turbofan engine 10, and a plurality of, or stage of, variable guide vanes 97. Each of the struts 96 and variable guide vanes 97 extend between the inner flowpath liner 92 and outer flowpath liner 94. As will be appreciated, the plurality of struts 96 are configured for supporting various components within the turbofan engine 10, and variable guide vanes 97 are configured to alter a swirl of an airflow through the core air flowpath 37.

Furthermore, the exemplary turbofan engine 10 depicted in FIG. 2 includes a cooling system 100 for cooling an airflow in the compressor section. The exemplary cooling system 100 generally includes a fluid tank 102 for storing a volume of cooling fluid and a fluid line assembly 104. The fluid line assembly 104 is in fluid communication with the fluid tank 102 for injecting cooling fluid from the fluid tank 102 into an airflow within (or upstream of) the compressor section. More specifically, as will be discussed in greater detail below, the fluid line assembly 104 includes an outlet 106 positioned upstream of the HP compressor 24 and downstream of the inlet 20 defined by the core casing 18 for injecting cooling fluid into an airflow upstream of the HP compressor 24.

In certain exemplary embodiments, the cooling fluid may be a consumable cooling liquid. For example, the cooling fluid may include water or a glycol-water mixture (which may be resistant to, e.g., freezing). Alternatively, however, in other embodiments, any other suitable cooling fluid may be provided. Notably, as used herein, the term "consumable" with reference to the cooling fluid refers to the manner in which the cooling fluid reduces a temperature of a component. Specifically, in at least certain exemplary aspects, the term consumable refers to a liquid which is configured to vaporize after contacting a component, absorbing heat and reducing a temperature of such component.

As is also depicted in FIG. 2, the exemplary cooling system 100 further includes a pump 108 for generating a flow of cooling fluid from the tank 102 through the fluid line assembly 104. The pump 108 may be a rotary pump including an impeller, or alternatively, may be any other suitable fluid pump. Additionally, for the embodiment depicted, the pump 108 and the fluid tank 102 are positioned outward of the core air flowpath 37 along the radial direction R. More specifically, the fluid tank 102 is located outward of the core casing 18, while the pump 108 is located inward of the core casing 18 and outward of the core air flowpath 37. For example, in certain exemplary embodiments, the fluid tank 102 may be positioned in a wing of an aircraft to which the turbofan engine 10 is attached, or alternatively, in a nacelle (e.g., the outer nacelle 50) of the turbofan engine 10. Accordingly, for the embodiment depicted, the fluid tank 102 is in fluid communication with the pump 108 through a fluid source line 110, which may extend through an outlet guide vane 52 (see FIG. 1) or another structural feature of the turbofan engine 10.

It should be appreciated, however, that in other exemplary embodiments, the pump 108 and/or tank 102 may alternatively be positioned inward from the core air flowpath 37 along the radial direction R. In such a configuration, or in other configurations, the pump 108 may be directly and/or indirectly coupled to, e.g., the LP shaft 36 or HP shaft 34 and driven by, e.g., the LP shaft 36 or HP shaft 34, respectively. Further, in still other embodiments, the cooling system 100 may not include a fluid tank 102, and instead the fluid line assembly 104 may be fluidly connected to any other suitable fluid source (e.g., a municipal water source for industrial applications).

Notably, in certain exemplary embodiments, the pump 108 may be in operable communication with a controller (not shown) of the turbofan engine 10 to control operation of the cooling system 100. For example, the controller may regulate a flow rate of the cooling fluid through the cooling system 100 based on, e.g., an operating condition of the turbofan engine 10, or in response to one or more temperature sensors (not shown).

Referring still to FIG. 2, the fluid line assembly 104 is configured for injecting cooling fluid into an airflow through the core air flowpath 37 upstream of the HP compressor 24. Particularly, for the embodiment depicted, the fluid line assembly 104 extends to the stage of inlet guide vanes 90, located upstream of the LP compressor 22. Additionally, the outlet 106 of the fluid line assembly 104 is aligned with the inlet guide vanes 90 along the axial direction A. As is depicted, the exemplary fluid line assembly 104 includes a portion extending into the core air flowpath 37 between adjacent inlet guide vanes 90, such that the outlet 106 is located within the core air flowpath 37. It will be appreciated, however, that in other exemplary embodiments, the outlet 106 of the fluid line assembly 104 may instead be integrated into one of the inlet guide vanes 90, or alternatively, may be integrated into an inner or outer liner extending between adjacent inlet guide vanes 90, or alternatively, extending forward or aft of the stage of inlet guide vanes 90. Notably, although not depicted, in certain exemplary embodiments, the fluid line assembly may include a nozzle or other similar structure defining the outlet 106.

Figure 3:
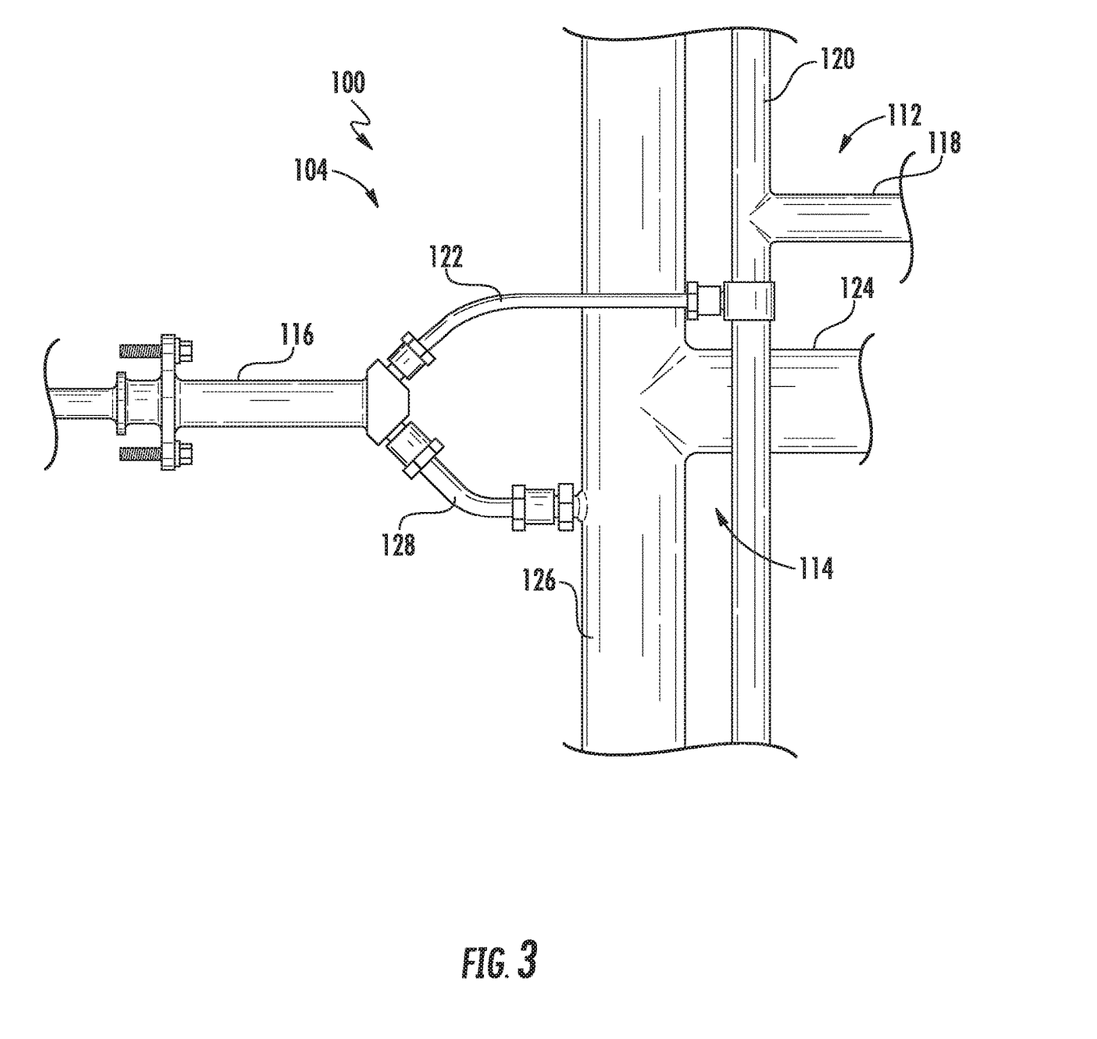
FIG. 3 is a close-up view of a portion of the exemplary cooling system of FIG. 2.
Figure 4:
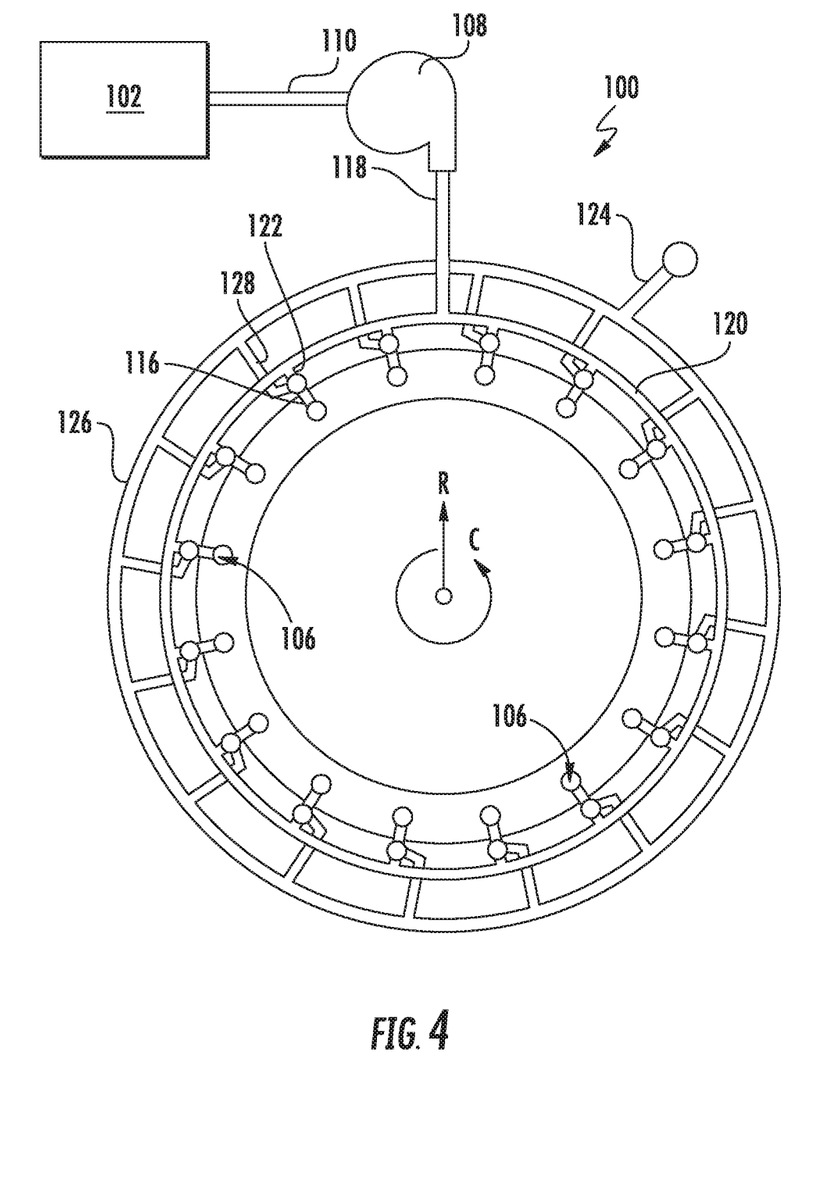
FIG. 4 is a schematic view of the exemplary cooling system depicted in FIG. 2, taken along an axial direction of the exemplary gas turbine engine of FIG. 1.

Referring now also to FIGS. 3 and 4, it will be appreciated, that the fluid line assembly 104 is further configured to atomize the cooling fluid (or, rather, atomize the cooling liquid) prior to injecting such cooling fluid into the airflow through the core air flowpath 37, such that the cooling fluid is provided as part of a mixture of cooling fluid and air (i.e., as a mixture of air having cooling liquid droplets suspended therein). FIG. 3 provides a close-up view of a portion of the fluid line assembly 104, and FIG. 4 provides a schematic view of the cooling system 100 along the axial direction A.

As is depicted in FIGS. 2 through 4, the exemplary fluid line assembly 104 depicted generally includes a cooling fluid line 112, a compressed air line 114, and a supply line 116. The supply line 116 is in fluid communication with both the cooling fluid line 112 and the compressed air line 114, and extends to the outlet 106 to provide the mixture of air and cooling liquid through the outlet 106. More specifically, the supply line 116 is configured to provide the flow of atomized cooling liquid through the outlet 106 to the core air flowpath 37 at a location upstream of the HP compressor 24.

More specifically, still, for the embodiment of FIGS. 2 through 4, the cooling fluid line 112 is formed of a first fluid line portion 118 extending from, and fluidly connected to, the pump 108; a second fluid line portion 120 extending generally along the circumferential direction C at a location inward of the core casing 18 along the radial direction R and outward of the core air flowpath 37 along the radial direction R; and a third fluid line portion 122 extending from the second fluid line portion 120. Similarly, the compressed air line 114 includes a first air line portion 124 extending from, and fluidly connected to, a high air pressure source (i.e., for the embodiment depicted, an aft stage of the HP compressor 24); a second air line portion 126 extending generally along the circumferential direction C at a location inward of the core casing 18 along the radial direction R and outward of the core air flowpath 37 along the radial direction R; and a third air line portion 128 extending from the second air line portion 126.

Referring particularly to FIG. 3, the third fluid line portion 122 of the cooling fluid line 112 extends to and fluidly connects with the supply line 116, and further, the third air line portion 128 of the compressed air line 114 also extends to and fluidly connects with the supply line 116. Further, referring now particularly to FIG. 4, the cooling fluid line 112 further includes a plurality of third fluid line portions 122 spaced along the circumferential direction C, the compressed air line 114 also further includes a plurality of third air line portions 128 spaced along the circumferential direction C, and the supply line 116 is further configured as a plurality of supply lines 116, each fluidly connected with a respective one of the third fluid line portions 122 and with a respective one of the third air line portions 128. Further, still, each supply line 116 includes a respective outlet 106, with each outlet 106 positioned upstream of the HP compressor 24 and downstream of the inlet 20 defined by the core casing 18 for injecting cooling fluid into an airflow through the core air flowpath 37 upstream of the HP compressor 24. More specifically, for the embodiment depicted, the outlet 106 of each of the supply lines 116 is aligned along the axial direction A with the stage of inlet guide vanes 90.

It should be appreciated, however, that the exemplary cooling system 100 described above with reference to FIGS. 2 through 4 is provided by way of example only. In other exemplary embodiments, the exemplary cooling system 100 may instead have any other suitable configuration. For example, referring now to FIG. 5, a side, schematic view is provided of a compressor section of a turbofan engine 10 including a cooling system 100 in accordance with another exemplary embodiment of the present disclosure. The exemplary turbofan engine 10 and cooling system 100 of FIG. 5 may be configured in substantially the same manner as the exemplary turbofan engine 10 and cooling system 100 described above with reference to FIGS. 2 through 4. Accordingly, the same or similar numbers may refer to the same or similar part.

Figure 5:
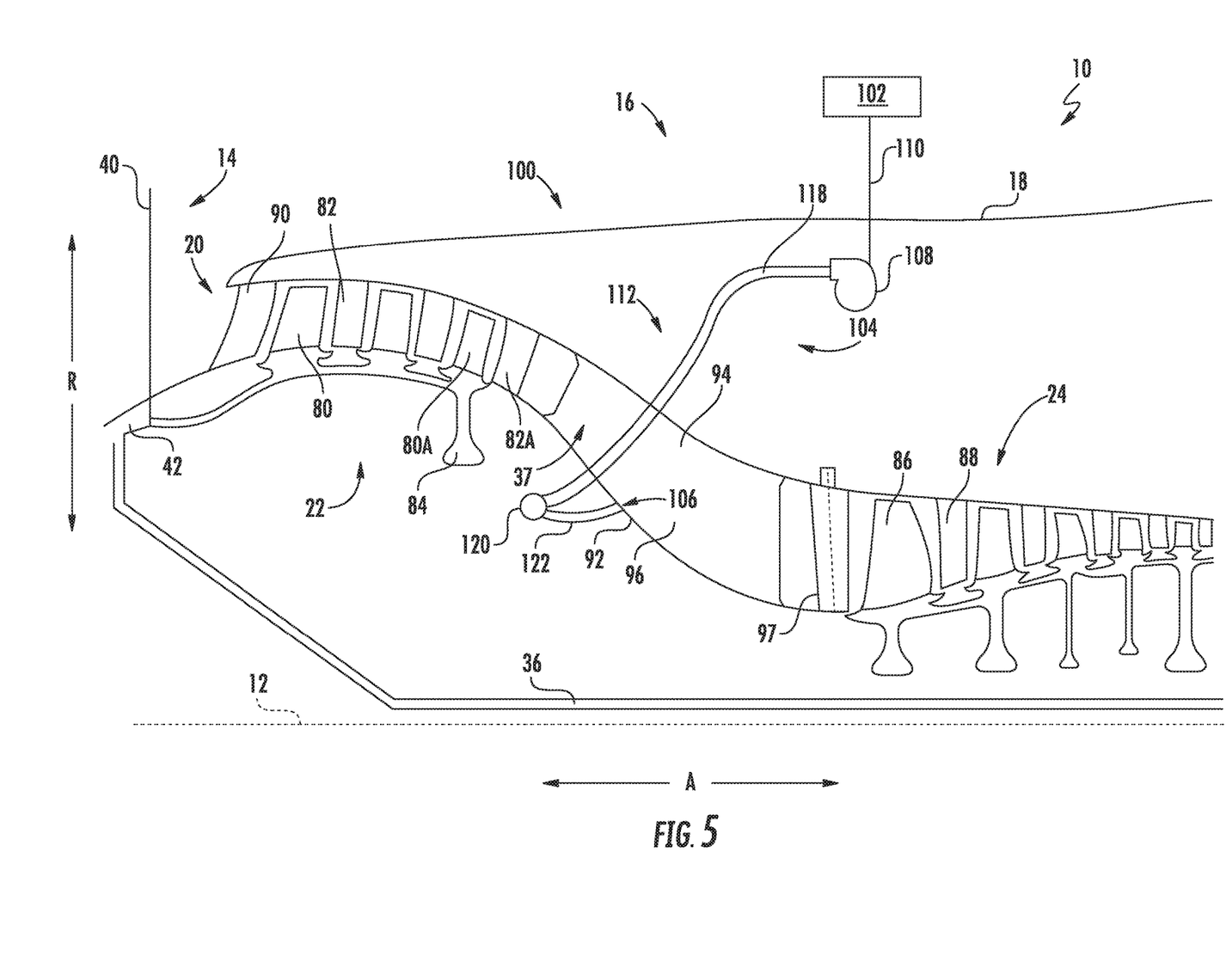
FIG. 5 is a close-up, schematic view of a compressor section of the exemplary gas turbine engine of FIG. 1, including a cooling system in accordance with another exemplary embodiment of the present disclosure.

For example, the exemplary turbofan engine 10 generally includes a compressor section having an LP compressor 22 located upstream of an HP compressor 24. Additionally, the turbofan engine 10 includes an outer flowpath liner 94 and an inner flowpath liner 92, each extending generally from the LP compressor 22 to the HP compressor 24. A plurality of struts 96 are included extending through the core air flowpath 37 from the outer flowpath liner 94 to the inner flowpath liner 92. Additionally, the turbofan engine 10 includes a cooling system 100 for cooling air in the compressor section. The cooling system 100 generally includes a fluid tank 102, a fluid pump 108, and a fluid line assembly 104, the fluid line assembly 104 including an outlet 106 positioned upstream of the HP compressor 24 and downstream of an inlet 20 defined by the core casing 18.

However, in contrast to the embodiment of FIGS. 2 through 4, for the embodiment depicted in FIG. 5, the outlet 106 is instead positioned downstream of the LP compressor 22. More specifically, the outlet 106 of the fluid line assembly 104 of FIG. 5 is positioned at the inner flowpath liner 92. For example, the outlet 106 may be positioned in or defined by the inner flowpath liner 92. Alternatively, however, in other embodiments, the fluid line assembly 104 may include a nozzle or other separate structure defining the outlet 106, with such nozzle or other separate structure mounted to, or positioned adjacent to, the inner flowpath liner 92.

As will be appreciated, since for the embodiment depicted the fluid tank 102 and fluid pump 108 are positioned outside the core air flowpath 37 (i.e., outward of the core air flowpath 37 along the radial direction R) at least a portion of the fluid line assembly 104 extends through the core air flowpath 37 to a location inward of the core air flowpath 37 along the radial direction R. Specifically, for the embodiment depicted, the fluid line assembly 104 generally includes a cooling fluid line 112 having a first fluid line portion 118, a second fluid line portion 120, and a third fluid line portion 122. Moreover, for the embodiment depicted, the first fluid line portion 118 of the cooling fluid line 112 of the fluid line assembly 104 extends through one of the struts 96 positioned upstream of the HP compressor 24 and downstream of the LP compressor 22.

Furthermore, it should be appreciated that as with the embodiment of FIGS. 2 through 4, the exemplary fluid line assembly 104 of FIG. 5 further includes a plurality of lines, with the plurality of lines spaced along the circumferential direction C and each including a respective outlet 106 for injecting cooling fluid into (or upstream of; see FIG. 2) the compressor section. More particularly, cooling fluid line 112 of the fluid line assembly 104 generally includes a plurality of third fluid line portions 122. Each of the third fluid line portions extends from the second fluid line portion 120 to a respective outlet 106.

Figure 6:
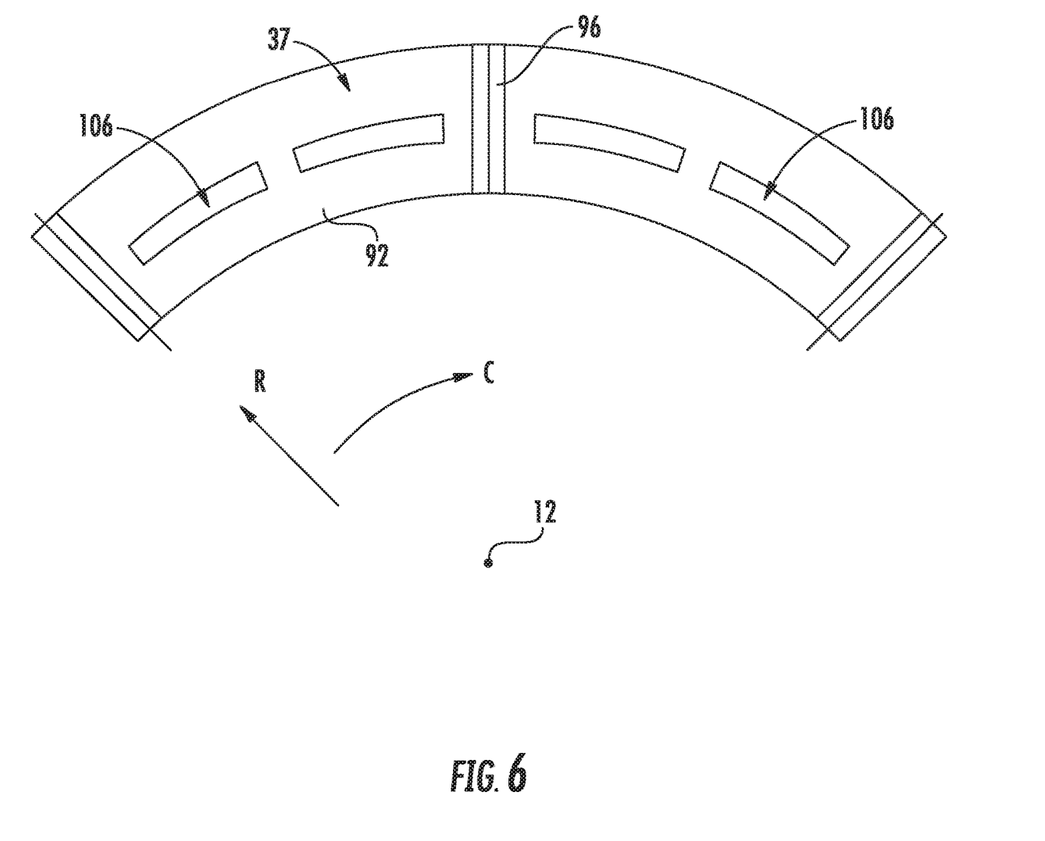
FIG. 6 is a schematic view of the exemplary cooling system depicted in FIG. 5, taken along an axial direction of the exemplary gas turbine engine of FIG. 1.

For example, referring briefly to FIG. 6, a schematic view along the axial direction A of a portion of the inner flowpath liner 92 of the turbofan engine 10 extending between the LP compressor 22 and the HP compressor 24 is provided. As is depicted, the plurality of outlets 106 of the fluid line assembly 104 are positioned in, or defined by, the inner flowpath liner 92 and spaced along the circumferential direction C. Such a configuration may allow for a more even distribution of the cooling fluid provided to the airflow in the core air flowpath 37 upstream of the HP compressor 24.

It should be appreciated, however, that although the embodiment of FIGS. 5 and 6 is not depicted as including a compressed air line 114 as part of the fluid line assembly 104, in other exemplary embodiments the configuration shown in FIGS. 5 and 6 may further include a compressed air line 114 (similar to the compressed air line 114 of FIGS. 1 through 4) for, e.g., atomizing the liquid through the outlet 106.

Further, in still other exemplary embodiments of the present disclosure, the cooling system 100 may have any other suitable configuration. For example, referring first generally to FIGS. 7 through 10, views of turbofan engines 10 including cooling systems 100 in accordance with various other embodiments of the present disclosure are provided. Each of the embodiments of FIGS. 7 through 10 may be configured in substantially the same manner as exemplary turbofan engine 10 and cooling system 100 described above with reference to FIGS. 2 through 4, and accordingly, the same or similar numbers may refer to the same or similar part. Each of the embodiments in FIGS. 7 through 10 is discussed individually in greater detail below.

For example, the exemplary turbofan engines 10 depicted in FIGS. 7 through 10 each generally include a compressor section having an LP compressor 22 and an HP compressor 24 located downstream therefrom. The LP compressor 22 includes alternating stages of LP compressor rotor blades 80 and LP compressor stator vanes 82. Additionally, the exemplary turbofan engines 10 of FIGS. 7 through 10 each also include a cooling system 100 for cooling air through (or upstream of) a core air flowpath 37 in the compressor section. The exemplary cooling systems 100 each generally include a fluid tank 102, a fluid pump 108, and a fluid line assembly 104. The fluid line assemblies 104 each include a cooling fluid line 112 having a first fluid line portion 118 extending from the pump 108 through the core air flowpath 37 to a location inward of the core air flowpath 37. Additionally, the fluid lines 112 of each of the fluid line assemblies 104 also include a second fluid line portion 120 fluidly connected to the first fluid line portion 118 and extending generally along the circumferential direction C of the turbofan engine 10, as well as a third fluid line portion 122 (or a plurality of third fluid line portions 122) extending from the second fluid line portion 120 to a respective outlet 106.

Figure 7:
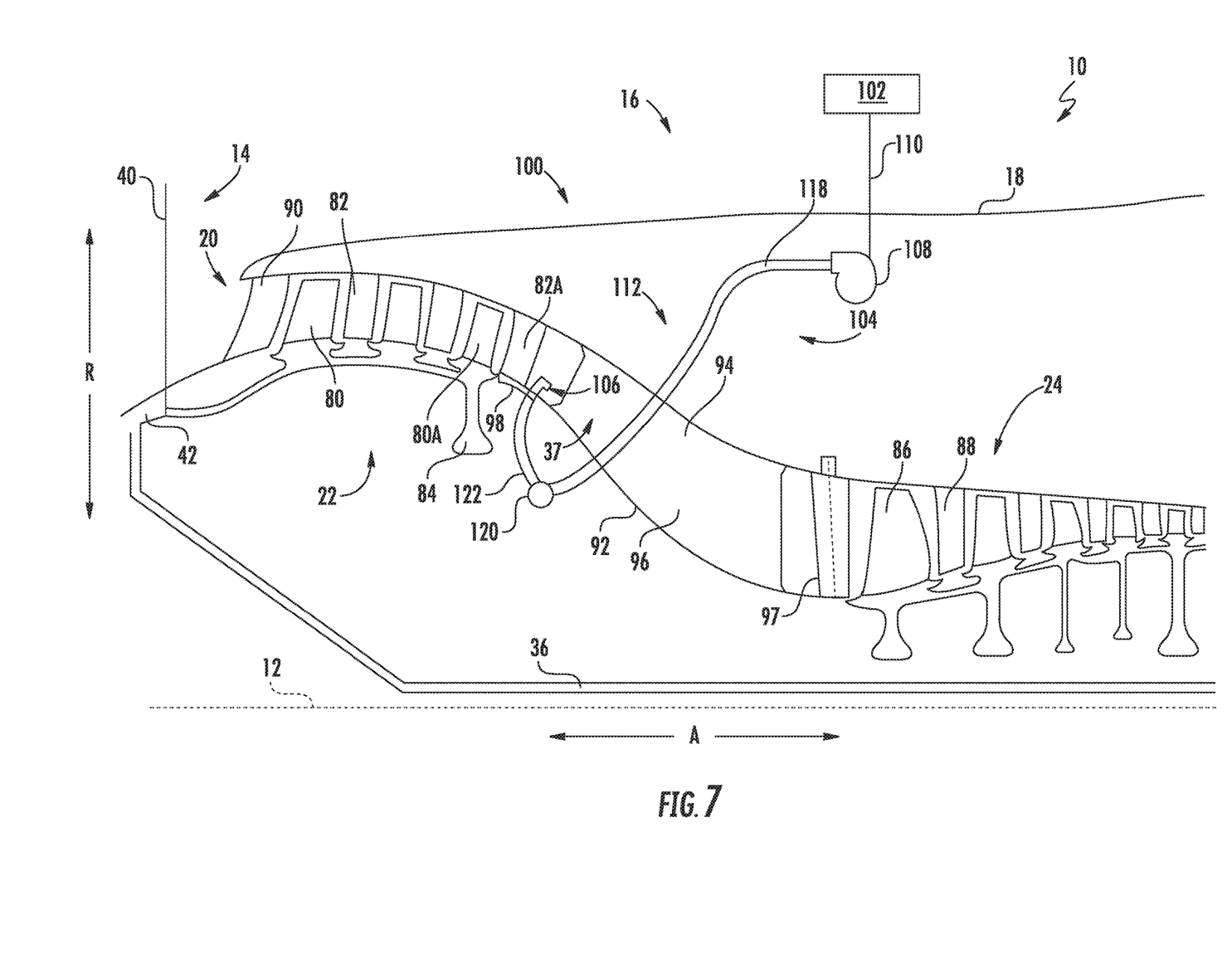
FIG. 7 is a close-up, schematic view of a compressor section of a gas turbine engine including a cooling system in accordance with another exemplary embodiment of the present disclosure.

Referring particularly to the embodiment of FIG. 7, the outlet 106 of the fluid line assembly 104, or more particularly, of the third fluid line portion 122 of the cooling fluid line 112 of the fluid line assembly 104, is positioned at an aft-most stage of LP compressor stator vanes 82A. More particularly, for the embodiment of FIG. 7, the third fluid line portion 122 of the fluid line assembly 104 extends through a base 98 of the aft-most stage of LP compressor stator vanes 82A, such that the outlet 106 is positioned within the core air flowpath 37 at the aft-most stage of LP compressor stator vanes 82A for injecting cooling fluid into an airflow through the core air flowpath 37 upstream of the HP compressor 24. However, in other exemplary embodiments, the outlet 106 may be defined in, attached to, or otherwise positioned adjacent to the base 98 of the aft-most stage of LP compressor stator vanes 82A.

Figure 8:
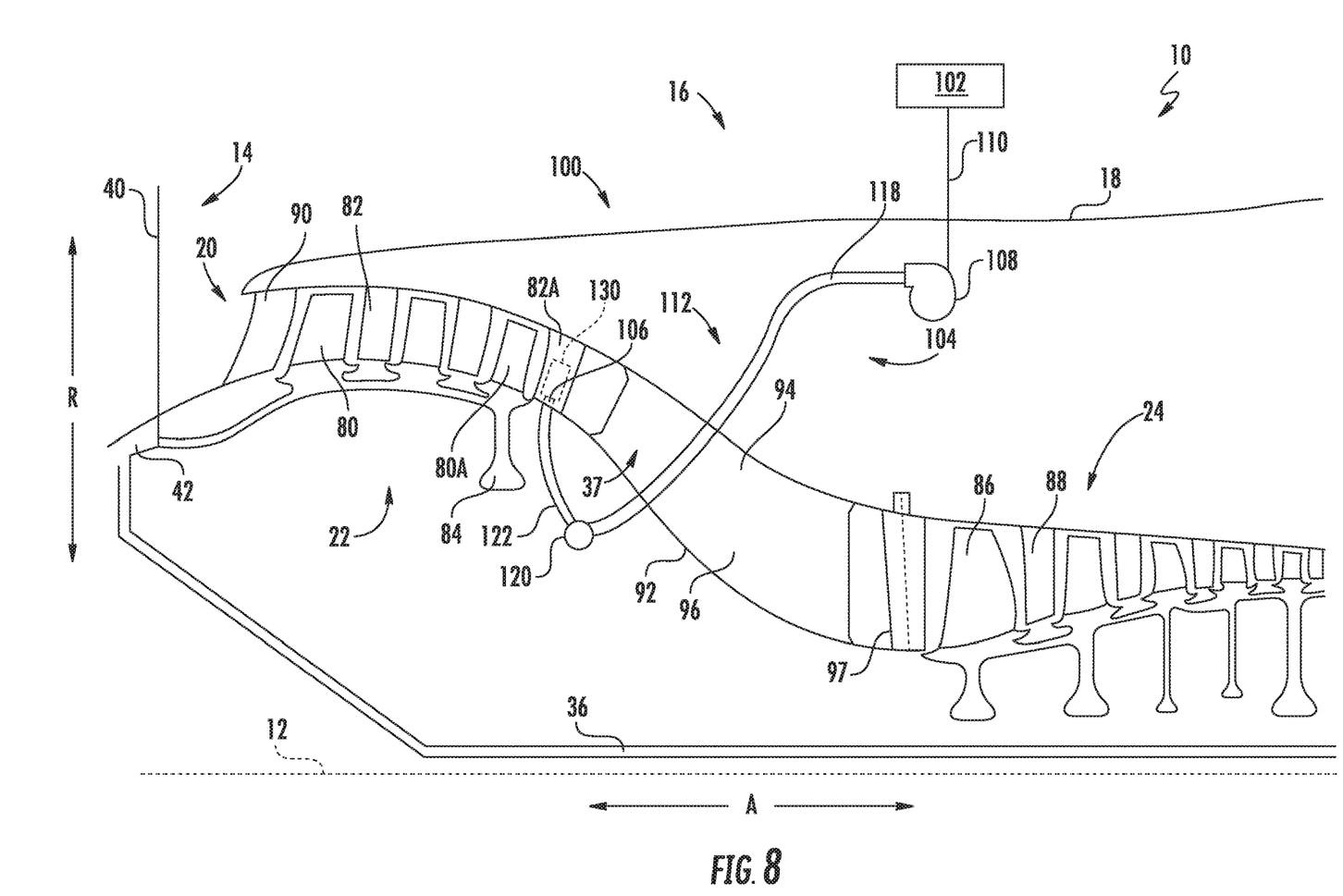
FIG. 8 is a close-up, schematic view of a compressor section of a gas turbine engine including a cooling system in accordance with still another exemplary embodiment of the present disclosure.
Figure 9:
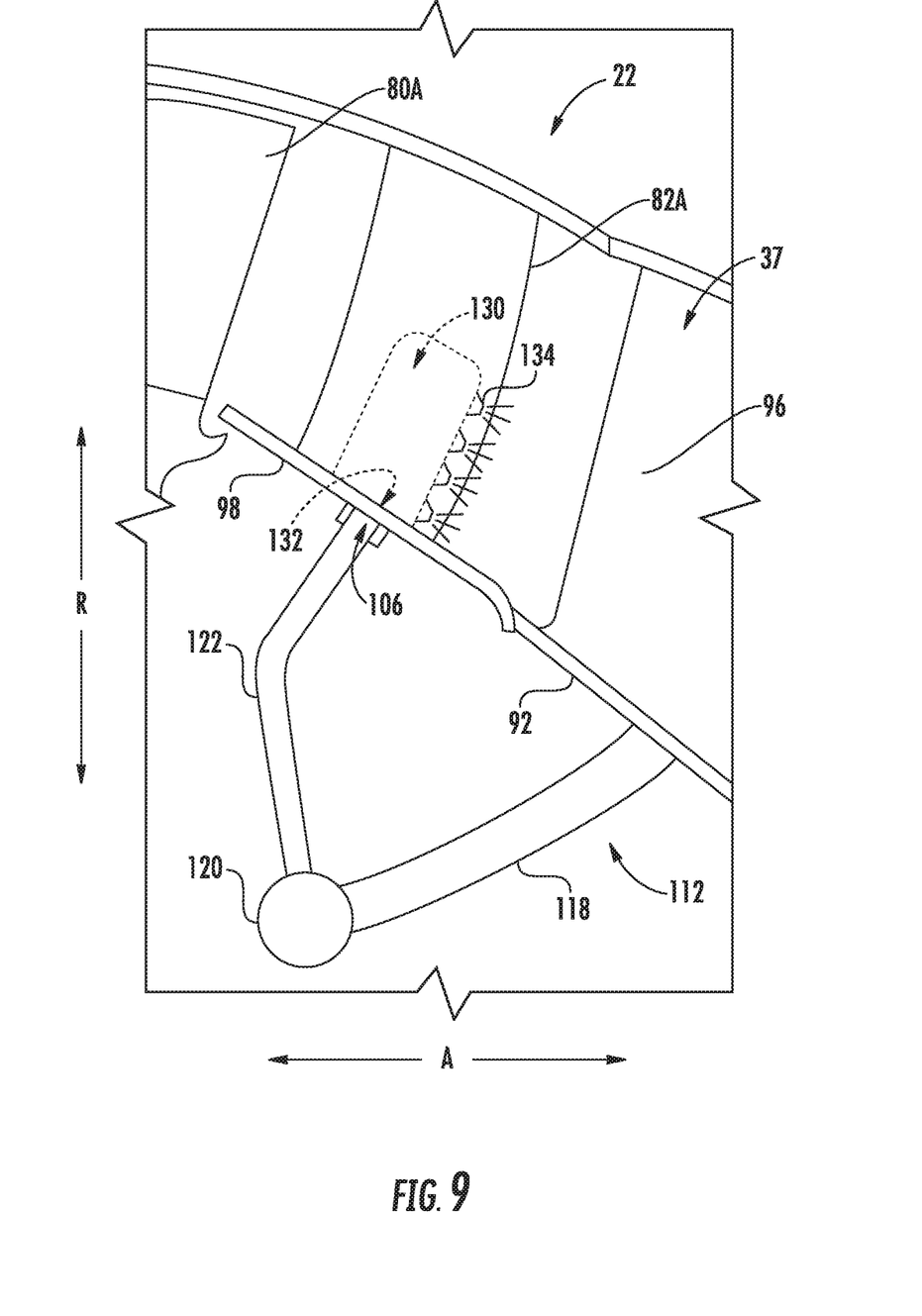
FIG. 9 is a close-up view of an aft-most stage LP compressor stator vane of the exemplary gas turbine engine of FIG. 8.

Similarly, referring now particularly to FIG. 8, the outlet 106 of the fluid line assembly 104 is positioned proximate one of the plurality of aft-most stage LP compressor stator vanes 82A and axially aligned with the LP compressor stator vanes 82A. For example, referring now also to FIG. 9, providing a close-up view of one of the aft-most stage LP compressor stator vanes 82A, the aft-most stage LP compressor stator vane 82A defines an internal cavity 130 defining an inlet 132 and including a plurality of nozzles 134, the plurality of nozzles 134 located proximate a trailing edge 136 for injecting cooling fluid into the airflow through the core air flowpath 37 upstream of the HP compressor 24. As is depicted, for the embodiment of FIGS. 8 and 9, the third fluid line portion 122 of the cooling fluid line 112 of the fluid line assembly 104 extends to the aft-most stage LP compressor stator vane 82A. Specifically, the outlet 106 of the third fluid line portion 122 is positioned adjacent to and in fluid communication with the inlet 132 of the internal cavity 130 of the LP compressor stator vane 82A.

Figure 10:
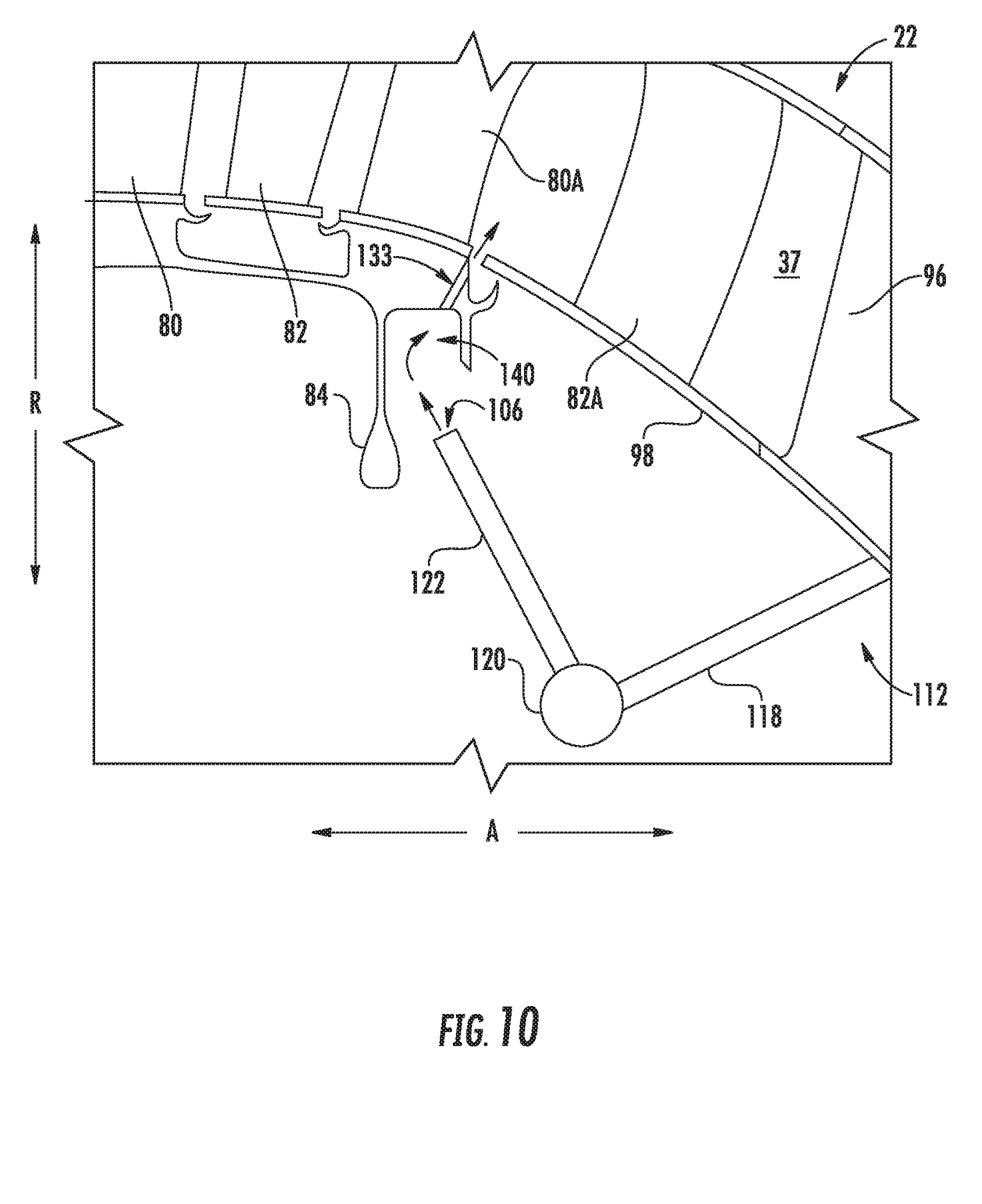
FIG. 10 is a close-up view of an aft-most stage LP compressor rotor blade of a gas turbine engine including a cooling system in accordance with yet another exemplary embodiment of the present disclosure.

Further, referring now to FIG. 10, a close-up view of a turbofan engine 10 and cooling system 100 in accordance with yet another exemplary embodiment of the present disclosure is provided. More particularly, FIG. 10 provides a close-up view of an aft-most stage of LP compressor rotor blades 80A and an aft-most LP compressor rotor 84. As noted earlier, each of the plurality of aft-most stage LP compressor rotor blades 80A are attached to the aft-most LP compressor rotor 84. Additionally, the aft-most LP compressor rotor 84 defines an opening 138 to the core air flowpath 37 extending through the compressor section. The outlet 106 of the fluid line assembly 104 for the exemplary cooling system 100 of FIG. 10, or more particularly, the outlet 106 of the third fluid line portion 122 of the cooling fluid line 112 of the fluid line assembly 104, is positioned to direct cooling fluid through the opening 138 of the aft-most LP compressor rotor 84 for injecting cooling fluid into an airflow through the core air flowpath 37 upstream of the HP compressor 24. More specifically, for the embodiment depicted, the rotor 84 defines a cavity 140 in fluid communication with the opening 138. The outlet 106 of the fluid line assembly 104 is oriented and positioned to provide cooling fluid to the cavity 140. During operation of the turbofan engine 10, the rotor 84 may be rotating about the longitudinal centerline 12 at a relatively high rotational speed. Such rotation may generate a centrifugal force on the cooling fluid collected within the cavity 140, driving the cooling fluid through the opening 138 to provide the cooling fluid to the airflow through the core air flowpath 37 upstream of the HP compressor 24. Notably, as with the other embodiments, the cooling fluid line 112 of the fluid line assembly 104 may include a plurality of third fluid line portions 122 spaced along the circumferential direction C.

It should be appreciated, however, that although the embodiments of FIGS. 7 through 10 are not depicted as including a compressed air line 114 as part of the fluid line assembly 104, in other exemplary embodiments the configurations shown in FIGS. 7 through 10 may further include a compressed air line 114 (similar to the compressed air line 114 of FIGS. 1 through 4) for, e.g., atomizing the liquid through the outlet 106.

Inclusion of the cooling system in accordance with one or more exemplary embodiments of the present disclosure may allow for the gas turbine engine to operate more efficiently. More specifically, by inclusion of a cooling system in accordance with one or more embodiments of the present disclosure, the compressor section may be operated at a higher overall compressor ratio with a reduced risk of exceeding any temperature limits of the components the compressor section. Further, by inclusion of an outlet of the cooling system located upstream of the HP compressor, a temperature of the compressed air throughout the HP compressor may be more completely minimized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a radial direction, the gas turbine engine comprising:
a compressor section for progressively compressing air, the compressor section including a high pressure compressor;
a core casing surrounding the compressor section and defining an inlet;
a cooling system for cooling air in or to the compressor section, the cooling system comprising a fluid line assembly, the fluid line assembly including an outlet positioned upstream of the high pressure compressor and downstream of the inlet defined by the core casing for injecting cooling fluid into an airflow upstream of the high pressure compressor,
wherein the compressor section further includes a low pressure compressor, and wherein the outlet of the fluid line assembly is positioned downstream of the low pressure compressor;
an inner flowpath liner extending between the low pressure compressor and the high pressure compressor; and
an outer flowpath liner also extending between the low pressure compressor and the high pressure compressor at a location outward from the inner flowpath liner along the radial direction, wherein the outlet of the fluid line assembly is positioned at the inner flowpath liner.

2. The gas turbine engine of claim 1, wherein the cooling system further includes a fluid tank in fluid communication with the fluid line assembly and a fluid pump for generating a flow of cooling fluid from the fluid tank through the fluid line assembly.

3. The gas turbine engine of claim 1, wherein the fluid line assembly includes a plurality of fluid lines, the plurality of fluid lines each including a respective outlet, the outlets of the plurality of fluid lines circumferentially spaced around the gas turbine engine.

4. The gas turbine engine of claim 1, wherein the cooling fluid comprises water.

5. The gas turbine engine of claim 1, wherein the cooling system further includes a fluid tank in fluid communication with the fluid line assembly, wherein the compressor section defines in part a core air flowpath, wherein the fluid tank is positioned outward of the core air flowpath along the radial direction.

6. The gas turbine engine of claim 5, wherein the fluid line assembly extends through the core air flowpath to a location inward of the core air flowpath along the radial direction.

7. The gas turbine engine of claim 1, wherein the fluid line assembly includes a plurality of fluid lines, the plurality of fluid lines each including a respective outlet, the outlets positioned at an inner flowpath liner extending between the low pressure compressor and the high pressure compressor.

8. The gas turbine engine of claim 1, wherein the fluid line assembly includes a plurality of fluid lines, the plurality of fluid lines each including a respective outlet, the outlets positioned circumferentially spaced around the gas turbine engine at an inner flowpath liner extending between the low pressure compressor and the high pressure compressor.

9. The gas turbine engine of claim 1, wherein the cooling system further includes a fluid pump for generating a flow of the cooling fluid into the airflow upstream of the high pressure compressor, wherein the compressor section defines in part a core air flowpath, wherein the fluid pump is positioned outward of the core air flowpath along the radial direction.

10. A cooling system for cooling air in or to a compressor section of a gas turbine engine defining an axial direction and a radial direction, the gas turbine engine comprising a core casing surrounding the compressor section and defining an inlet, the compressor section including a high pressure compressor, the cooling system comprising:
a fluid line assembly, the fluid line assembly including an outlet configured to be positioned upstream of the high pressure compressor and downstream of the inlet defined by the core casing for injecting cooling fluid into an airflow upstream of the high pressure compressor,
wherein the compressor section further includes a low pressure compressor, and wherein the outlet of the fluid line assembly is configured to be positioned downstream of the low pressure compressor;
an inner flowpath liner extending between the low pressure compressor and the high pressure compressor; and
an outer flowpath liner also extending between the low pressure compressor and the high pressure compressor at a location outward from the inner flowpath liner along the radial direction, wherein the outlet of the fluid line assembly is positioned at the inner flowpath liner.

11. The cooling system of claim 10, wherein the cooling system further includes a fluid tank in fluid communication with the fluid line assembly and a fluid pump for generating a flow of cooling fluid from the fluid tank through the fluid line assembly.

12. The cooling system of claim 10, wherein the fluid line assembly includes a plurality of fluid lines, the plurality of fluid lines each including a respective outlet, the outlets of the plurality of fluid lines circumferentially spaced around the gas turbine engine.

13. The cooling system of claim 10, wherein the cooling fluid comprises water.

14. The cooling system of claim 10, wherein the cooling system further includes a fluid tank in fluid communication with the fluid line assembly, wherein the compressor section defines in part a core air flowpath, wherein the fluid tank is positioned outward of the core air flowpath along the radial direction.

15. The cooling system of claim 14, wherein the fluid line assembly extends through the core air flowpath to a location inward of the core air flowpath along the radial direction.

16. The cooling system of claim 10, wherein the fluid line assembly includes a plurality of fluid lines, the plurality of fluid lines each including a respective outlet, the outlets positioned at an inner flowpath liner extending between the low pressure compressor and the high pressure compressor.

17. The cooling system of claim 10, wherein the fluid line assembly includes a plurality of fluid lines, the plurality of fluid lines each including a respective outlet, the outlets positioned circumferentially spaced around the gas turbine engine at an inner flowpath liner extending between the low pressure compressor and the high pressure compressor.

18. The cooling system of claim 10, wherein the cooling system further includes a fluid pump for generating a flow of the cooling fluid into the airflow upstream of the high pressure compressor, wherein the compressor section defines in part a core air flowpath, wherein the fluid pump is positioned outward of the core air flowpath along the radial direction.

* * * * *